Aug. 21, 1928.

J. R. BARNHART 1,681,720

SYNCHRONOUS ELECTRIC VIBRATOR

Filed Feb. 10, 1923   4 Sheets-Sheet 1

INVENTOR
Joseph R. Barnhart,
BY
Harold Elwin Smith
ATTORNEY

Aug. 21, 1928.

J. R. BARNHART 1,681,720

SYNCHRONOUS ELECTRIC VIBRATOR

Filed Feb. 10, 1923   4 Sheets-Sheet 2

INVENTOR
Joseph R. Barnhart,
BY
ATTORNEY

Aug. 21, 1928.

J. R. BARNHART 1,681,720

SYNCHRONOUS ELECTRIC VIBRATOR

Filed Feb. 10, 1923    4 Sheets-Sheet 3

INVENTOR
Joseph R. Barnhart
BY
Harold Eber Smith
ATTORNEY

Aug. 21, 1928.
J. R. BARNHART
1,681,720
SYNCHRONOUS ELECTRIC VIBRATOR
Filed Feb. 10, 1923
4 Sheets-Sheet 4

INVENTOR
Joseph R. Barnhart
BY
ATTORNEY

Patented Aug. 21, 1928.

1,681,720

UNITED STATES PATENT OFFICE.

JOSEPH R. BARNHART, OF CLEVELAND, OHIO, ASSIGNOR TO WALTER M. SCOTT, OF CLEVELAND, OHIO.

SYNCHRONOUS ELECTRIC VIBRATOR.

Application filed February 10, 1923. Serial No. 618,280.

This invention relates to a synchronous electric vibrator and was developed especially for use with alternating current rectifiers, although not limited thereto. It is well known that an alternating electric current exhibits a vibratory electric condition with a frequency generally between 25 and 60 cycles per second depending upon the initial design and the speed of operation of the generator. This alternating flow can be utilized to produce an alternating magnetic field which when combined with a uni-directional field such as produced by permanent magnets or a direct current solenoid, can be caused to vibrate a suitable reed or other armature, and if said reed or armature be itself tuned accurately to conform to the periodicity of the current it can be caused to actuate a contact mechanism whereby the current can be changed into a uni-directional flow suitable for electrolytic purposes, such as charging storage batteries or other uses. However experience proves that it is very difficult to tune such a reed with exactness; its tuning is likely to change any time, either as a result of accident or of molecular change; its natural rate is changed by the presence and adjustment of the contact devices; and the frequency of the electric current is not permanent even in any one plant, and varies considerably between different plants.

In case of a disagreement between the frequency of the current alternations and the natural period of the reed, one of two things is likely to occur: in case the discrepancy is only slight, the reed will either gain upon or lag behind the current pulsations until a given phase difference is reached after which the magnetic effect will hold it at that point with a fixed phase difference either of lead or of lag; but if the disagreement be greater than a certain small number of beats per second, this lead or lag will exist only for a short period after which the reed will fall completely out of step, flutter irregularly for a short time, and then momentarily fall in step with the current a second time either ahead or behind as the case may be, and repeat the process indefinately. Either condition is obviously detrimental to the operation of a device which requires uniformity and accuracy, such as a rectifier. Obviously the last described extreme condition is unusable, while the first described condition is unsatisfactory for the following reason: In order to secure efficiency the phase of the contact points must correspond exactly with the phase of electric waves, since any discrepancy in phase will not only means a loss of a part of the energy, but will involve sparking at the terminals by reason of the making and breaking of the circuit at instants of high E. M. F., and will also enable a back-surge of current during a part of each cycle. Thus an attempt to charge a storage battery with a badly adjusted rectifier will not only not succeed, but will serve further to deplete the battery, and because of the alternations will have a very destructive effect upon the plates.

The objects of this invention are the provision of new and simple expedients for controlling the vibration of such an armature; the provision of new and simple means for keeping a synchronous vibrator strictly in phase with the electric current with which it is used; the provision of an improved synchronous vibrator in which accurate tuning is unnecessary and the existence of resonance between the current and armature dispensed with; the provision of new and improved method of winding an alternating current rectifier; while further objects and advantages of the invention will become apparent as the description proceeds.

In the drawings accompanying and forming a part of this application, I have illustrated one physical embodiment and various diagrams of devices embodying my improvements.

Describing first the theoretical aspect of the invention, with special reference to Figs. 3 to 7 inclusive, it is well known that a primary alternating E. M. F. (E$p$) such as that represented by the sine wave 1 in Fig. 3, induces a magnetic flux ($\phi p$) 90° behind it in any core about which it may pass, this flux being represented by a similar sine wave 2, 90° or one-fourth cycle behind the same. This in turn induces a secondary E. M. F. (E$s$) 90° still further behind, which may be represented by the sine wave 3 which is a complete half-cycle or 180° behind the primary E. M. F.

Figure 3:
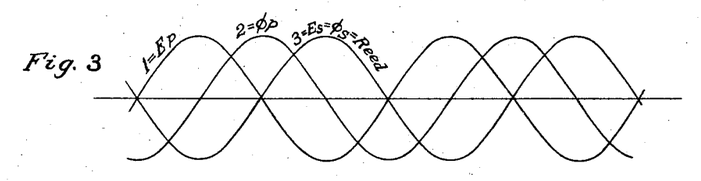
Fig. 3 is a diagram showing the relation of the primary E. M. F. secondary E. M. F., and primary flux in an alternating transformer.
Figure 4:
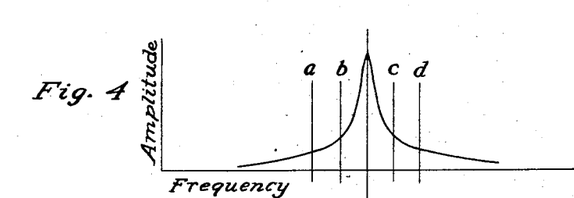
Fig. 4 is a frequency-amplitude diagram.
Figure 5:
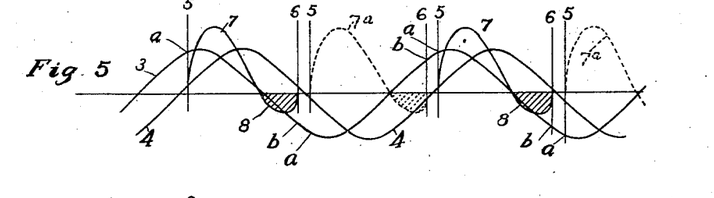
Fig. 5 is a diagrammatic view illustrating the current behavior with a mistuned armature.

In case the magnetic flux be utilized to vibrate a reed or armature having the same natural frequency as the current this reed or armature behaves in the same way as the secondary E. M. F., that is its sensible motion lags behind the magnetic flux which produces it by exactly 90°; so that the line 3 can also be considered as the curve of sensible motion of the armature under such conditions. This relationship of tuned reed and induced E. M. F. suggests the feasibility of employing the reed to open and close suitable circuits so as to convert the alternating secondary current into a uni-directional current suitable for charging storage batteries and other electrolytic work. Numerous attempts have been made to effect this result, but it is found that minor discrepancies between the frequency of the current and that of the reed exert a surprisingly harmful influence. Thus the ordinary electric light plant used in the United States is supposed to deliver alternating current having 60 cycles per second, but this depends wholly upon the uniformity of speed of the steam-engine, waterwheel or other prime mover, and a variation of one or two cycles per second in either direction is not uncommon in the best plants, while variations of much larger value are frequently found in the older and smaller installations. These variations have no appreciable effect on the behavior of most electrical apparatus but have a most decided effect upon the behavior of a tuned reed. Besides, the presence and even the adjustment of the contact members further affects the rate of the reed.

In order to secure the theoretically exact results shown in Fig. 3, namely an exact synchronism of the reed movement with the induced current, one must have exact resonance between the reed and the magnetic flux; but such a condition of resonance is a very exact and very delicate thing. As such condition is approached the amplitude of vibration of the reed increases with remarkable suddenness as shown by the diagram, Fig. 4, and as soon as this particular point is passed not only is lead changed to lag (or lag to lead) but a phase displacement occurs between the current and armature whose value is disproportionate to the change in frequency. This result, when encountered in a rectifier, causes the reed to fall out of step with the induced current with the effect shown in Fig. 5 wherein the line 3 represents the secondary E. M. F. and the line 4 represents the sensible motion of a lagging reed. The points 5, 6 represent the instants at which the contact points carried by the reed open and close the circuit; and owing to the phase displacement, such open and closing occurs, not at a point near the zero line when the E. M. F. is small, but at points $a$ and $b$ some distance therefrom where the E. M. F. is comparatively large. This necessarily involves excessive sparking, added to which the line 7 which represents the current flowing through those contact points, instead of terminating at the same side of the zero line is continued across such line as shown at 8 and changes sign, thereby producing a reverse surge of current as shown by the shaded area in Fig. 5. It should be noted that the strength of the currents bears no necessary relation to the height of the curves 3 and 4 in this diagram which is merely drawn for illustrative purposes to show qualitatively the effect of a mistuned reed. In this diagram I have also shown alternate waves in full lines, the intermediate dotted line wave-loops representing the effect of the retifier in inverting certain of the waves. The same effect would be produced by a leading reed except that the discharging loop 8 would occur at the start of each half cycle instead of at the end.

The behavior of a mistuned reed when used with a simple alternating field of the type just described varies with the degree of its mistuning. If the disagreement be but small, say two or three per cent, the reed will maintain a fixed phase relation as regards the magnetic flux, either ahead or behind as the case may be; but in the case of a reed or armature having contact members which impede its free movement, if the discrepancy is increased much beyond this point its phase will gradually diverge from that of the field until it falls completely out of step whereupon it will flutter wildly a few times and again fall into step with some wave either ahead or behind and repeat the same performance.

Figure 6:
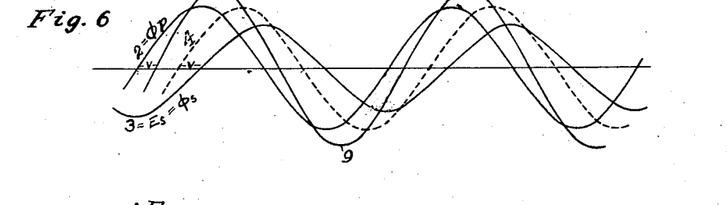
Fig. 6 is a wave diagram and Fig. 7 a vector diagram showing graphically my improved mode of regulating the vibration of the reed; while Figs. 8 to 13, inclusive, are diagrams of different winding arrangements for utilizing my inventive idea.

I have discovered that by combining with the primary magnetic flux a certain proportion of magnetic flux generated by the induced current I can advance or retard the phase of such a reed so as to bring it into agreement with the induced E. M. F. with which it is desired to co-operate or with any other constant of the apparatus; and in order to avoid the sensitiveness of a resonant condition I preferably time the reed a sufficient amount either above or below the established current frequency to minimize the chance that the sensitive point will be overlapped. In this way instead of trying to balance the operation upon the peak of the curve shown in Fig. 4 I operate in the region of smaller curvature between $a$—$b$ or $c$—$d$, where the effect of a change in frequency is less pronounced. Fig. 6 shows such a combination of fluxes as is provided to restrain a leading reed. The line 2 represents the primary flux, $(\phi p)$ 3 the secondary flux $(\Phi s)$ (which coincides with the secondary E. M. F., (E$s$)) and the dotted line 4 represents the wave which a slightly leading reed would make if subjected only to the action of the primary flux 2. However, by so arranging the coils which influence the reed as to subject the same also to the influence of a secondary flux a resultant force is obtained differing in phase from both the component forces. This is represented in Fig. 6 by the line 9 which is the sum of the waves 2 and 3 and is so chosen as to lag behind the curve 2 the same amount that the reed tends to lead the secondary E. M. F. here represented by the angle V.

This amount is adjusted in accordance with the force which the respective fields are permitted to exert upon the reed, i. e. the number of ampere turns which influence the reed or the number of secondary windings which energize those turns.

Figure 7:
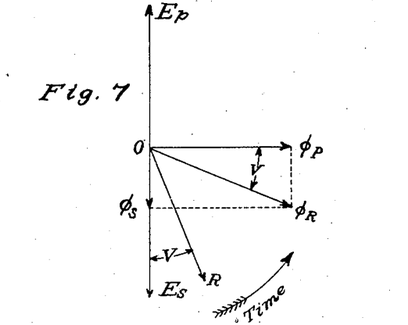

A simpler mode of illustrating these relationships is by the vector diagram shown in Fig. 7, wherein time is computed circularly about the point O in the direction of the arrow. At any given instant the primary E. M. F. is represented at E$p$, the primary flux which is 90° behind the same is represented at $\Phi p$ and the secondary E. M. F. (which is 90° behind the primary flux and 180° from the primary E. M. F.) is represented at E$s$. Now if the reed were resonant its phase position would coincide with the line O—E$s$ but if it be a leading reed (for example) its phase will be displaced more or less toward the line O$\phi p$ say to the line OR making an angle V with the secondary E. M. F. which is also the secondary current (assuming a secondary circuit having negligible capacity and inductance such as a closely connected storage battery).

Therefore in order to restrain the reed to a position of coincidence with the line OE$s$ it is necessary to subject it to a magnetizing field which is displaced behind $\Phi p$ the same angle V by which the reed is out of step, say the line O—$\Phi$R; and to secure this field I take such a proportion of the secondary flux compared to the primary flux as the length of the line O$\Phi s$ bears to the length of the line O$\Phi p$, thereby conforming to the parallelogram of forces.

The foregoing diagram assumes a coincidence of the secondary flux, secondary E. M. F., and secondary current, in other words a non-inductive, low capacity, circuit, but this correction is not limited to such a condition since by properly choosing the relative amounts of primary and secondary flux which shall act upon the reed its phase can be adjusted to any point within the entire circle, thus causing its motion to coincide with any constant of any circuit energized from that particular alternating source. It will be understood that, so far as this reed is concerned it is unimportant whether it be employed to make or break a secondary circuit induced by the same primary flux which produces its own vibration or whether it rectifies the current in a different circuit of the same alternator, or whether the reed be energized by the same secondary circuit which is being rectified or by some special circuit provided for this one purpose.

Figure 1:
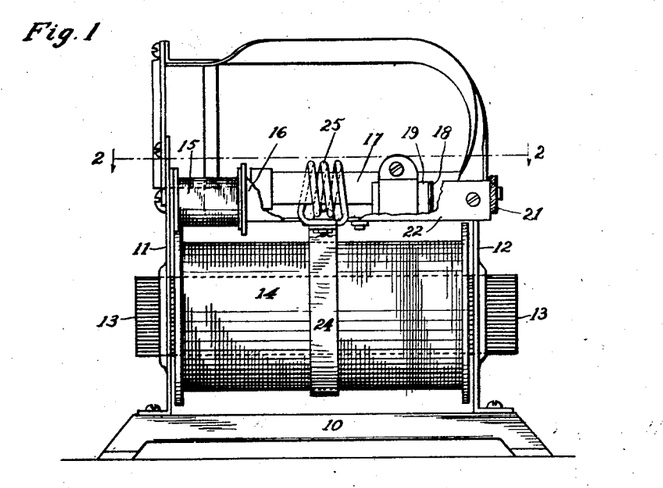
Fig. 1 represents a side elevation of a practical rectifier containing my invention, certain parts being broken away.
Figure 2:
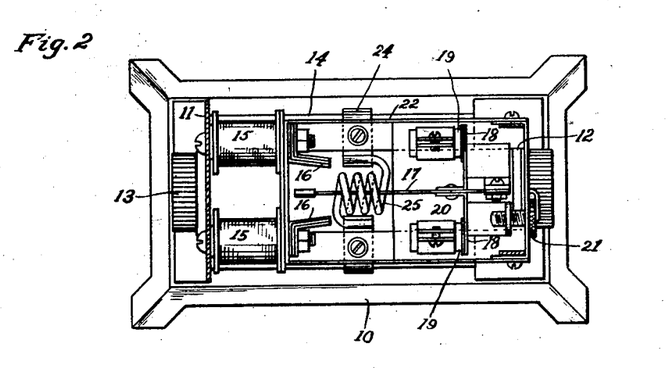
Fig. 2 is a sectional view corresponding to the line 2—2 of Fig. 1.

One commercial construction of rectifier embodying my improvements is shown in Figs 1 and 2 hereof wherein I have shown a simple and compact transforming rectifier embodying the foregoing principles. In these views, 10 represents a suitable base plate having adjacent its ends the upright iron pole pieces, 11 and 12, apertured for the reception of the magnetic core 13 which is surrounded by the transformer winding 14. Secured to the pole piece 11 at a point above the coil are a pair of direct-current magnets, 15, 15, arranged one at each side of the center line of the device. The cores of these magnets make magnetic contact at one end with the pole piece 11 and at their opposite ends are provided with individual pole pieces 16, 16 which face each other upon opposite sides of a vibrating reed 17 carried by the pole piece 12. This reed is made of magnetically permeable material such as spring steel and is preferably tuned slightly above the frequency of the current with which it is to be used. The exact frequency of the reed need not be accurately adjusted so long as it is wholly to one side the probable variations in current frequency and also inside the tolerance limit of the compensating coil hereafter described. Suitable contacts 18, 18, are carried by this reed and co-operate with other contact members 19, 19 supported upon the frame of the instrument. In the present embodiment I have shown the contacts 18 as carried by arms projecting laterally from the reed and the contact 19 as mounted on a carriage 20 adjustable bodily along the instrument by means of the screw 21. This is the preferable arrangement and conforms to that of my application filed Oct. 6, 1920, Serial No. 415,090, although the present improvements are not limited thereto.

24 represents a strip of brass or similar conducting material looped around the winding 14 and supported by but insulated from the frame 22 which supports the carriage. The ends of this strip are connected by a few turns 25 of comparatively heavy wire loosely surrounding the reed 17.

Figure 8:
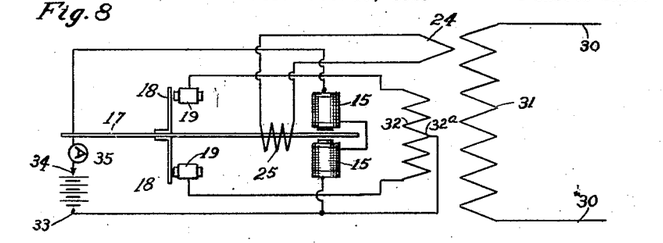

The wiring diagram actually employed on the instrument shown in Figs. 1 and 2 is illustrated in Fig. 8, wherein 30, 30 are the alternating current mains to which are connected the opposite ends of the primary winding 31. 32 represents the secondary winding of the transformer, which is generally made with a much smaller number of turns than the primary winding (inasmuch as the major use of this instrument is to charge storage batteries at a potential of from 6 to 18 volts) and has each of its ends attached to one of the contacts 19 and its midpoint 32$^a$ connected to one of the battery terminals 33. The other battery terminal is attached to the reed 17, an ammeter 35 being interposed if desired, while the direct current magnets 15, 15, are connected as a shunt between the battery terminals. The loop 24 and coil 25 constitute a wholly independent circuit.

Upon attaching the device to the alternating mains and prior to attaching the battery at the point indicated the sole effect will be to draw sufficient power from the alternating mains to magnetize the core. Upon attaching a storage battery between the terminals 33 and 34, the back electromotive force thereof produces such a uni-directional magnetic field as serves, in co-operation with the alternating magnetic field, to produce a vibration of the reed 17. This reed, being tuned to a higher frequency than that of the current will tend to lead the current, but this tendency is overcome by the effect of the magnetic field produced in the coil 25. It will be noted that the effect of this coil depends on the direction in which it is wound, and the same must be designed to produce a phase displacement of the magnetic field surrounding the reed in the appropriate direction. The intensity of the force produced by this secondary field depends upon the number of turns of the coil 25 and of the secondary winding 24 and the resistance in circuit. For example with a 6 volt rectifier operating on a 110 volt circuit with 1200 turns in the primary winding I have had excellent results with a reed tuned to 65 vibrations per second and an auxiliary coil 25 of four turns connected to a special secondary of one turn as shown, the current induced in this coil being about 40 amperes. However, I mention this only as an example of one arrangement which has proved satisfactory inasmuch as a change in any one of the constants mentioned necessitates a change in others, and the effect of this secondary coil varies directly with the number of turns therein and also the number of turns of the secondary which energizes it.

Figure 9:
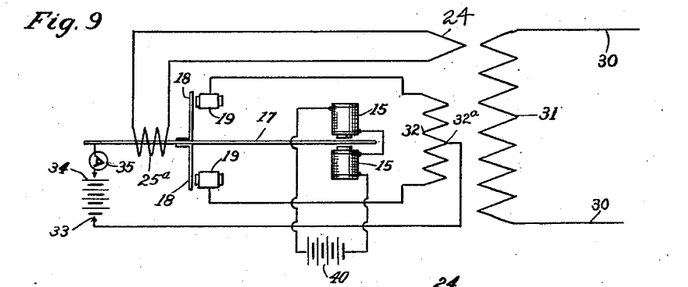

In Fig. 9 I have illustrated a modified winding diagram wherein the magnets 15, 15 are energized by a direct current source 40 other than the storage battery which is to be charged. Indeed this arrangement is in some respects only the equivalent of a permanent magnet inasmuch as the two batteries must be connected to the instrument in the proper direction, whereas if only a single battery be used, as in Fig. 8, the instrument is self-determinating as to its polarity and cannot be connected wrongly. However, the arrangement shown in Fig. 9 is advantageous in case the instrument is used to charge batteries of varying potentials or in some types of electrolytic work. In this case I have shown the auxiliary coil 25$^a$ as looped around the fixed end of the reed rather than the free end, since it is immaterial what part of the reed circuit be subjected to its influence.

Figure 10:
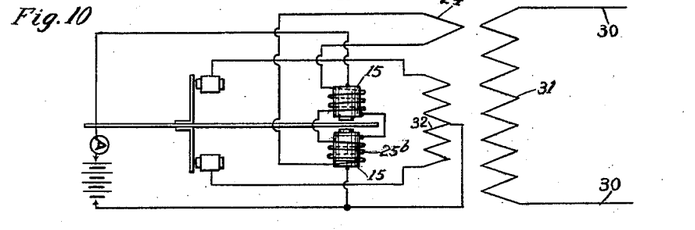
Figure 11:
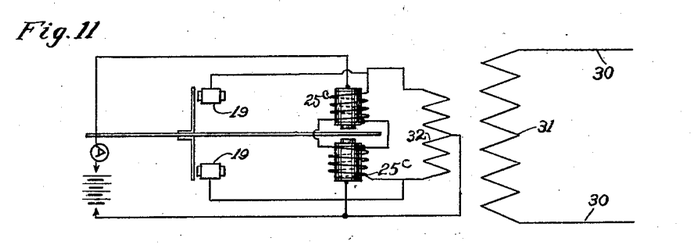

Inasmuch as the direct current magnets 15, 15 constitute a part of the magnetic circuit of this reed, a similar result can be obtained by applying this auxiliary coil thereto. This merely requires that the auxiliary coil be wound around the magnets and connected either to the special secondary 24 as shown at 25$^b$ in Fig. 10, or across the ends of the transformer secondary 32 as shown at 25$^c$ in Fig. 11. In order to avoid short circuiting the secondary in the last mentioned case the coil 25$^c$ is necessarily made of a comparatively large number of turns of rather fine wire; it will be remembered that the location of the coil 25$^c$ is the equivalent of its location at 25 or 25$^a$, and when applied to the magnets or branches 15, 15, it must be wound about the same in a direction to form similar poles at their adjacent ends instead of opposite poles.

Figure 12:
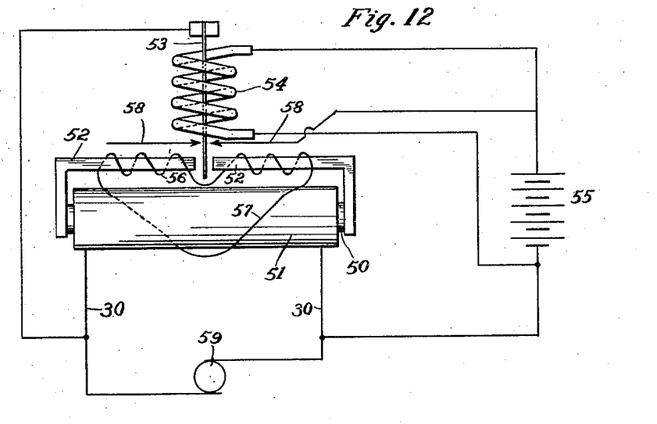

In the foregoing examples I have shown a vibrating reed employed in combination with a magnetizing winding which also constituted the primary of a transformer, although the transformer function is entirely independent of the operation of my present improvement. In Fig. 12 I have shown one embodiment of my invention omitting all transformer features. 50 represents the core of an alternating current magnet having a winding 51 connected to the alternating mains 30, 30, said core having pole pieces 52, 52 located upon opposite sides of the reed 53. This reed is under the influence of a direct current solenoid 54 energized by the battery 55. The auxiliary coil here takes the form of windings 56 surrounding the pole pieces 52 and connected to a secondary 57 consisting of one or more turns as may be necessary. In this case the turns 56 are wound upon the two poles in the same direction so as to tend to make opposite polarity at opposite sides of the reed. The contact members are represented diagrammatically by the arrows 58, 58 which can be employed for any purpose related to the frequency of the alternator 59 which supplies the circuit. In the present embodiment I have shown one of them connected to the storage battery 55 in such wise as to transmit thereto every alternate half-cycle of current. It will be understood that this arrangement would be feasible only in case the potential of the battery is fairly near that of the current and that in case of wide variance a transformer or resistance can be employed.

Figure 13:
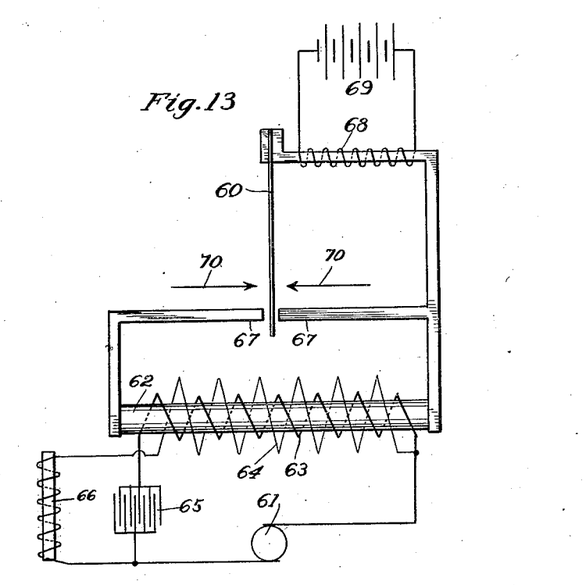

In Fig. 13 I have shown yet another expedient for producing a phase relation of the reed 60 having any desired relationship to that of the current produced by the alternator 61. In this case the core 62 is surrounded by two windings 63 and 64, connected in split-phase relation to the alternator 61 by reason of unequal capacity and inductance. I have shown a condenser 65 as contained in the one circuit and an inductive resistance 66 in the other circuit although usually it will be sufficient to employ only one of these modifying agencies to regulate their relative effect by increasing or decreasing the number of magnetizing turns through which they act. In this way the phase of the magnetic flux acting through the poles 67, 67 can be either advanced or retarded, and this flux, acting in conjunction with the uni-directional flux of the magnetizing coil 68 energized by the direct current source 69, will vibrate the reed 60 at any desired phase relative to the phase of the alternator 61, and its movements can be utilized through the agency of the contacts 70, 70 for any purpose desired.

When my improvements are employed in connection with a rectifier I prefer that the reed be tuned to a higher frequency than that of the current for certain practical reasons, although theoretically the same result will follow from either direction. However the effect of the contact members is always to tend to increase the frequency and the tighter the adjustment the greater the increase. Accordingly if one attempts to tune the reed to a lower pitch than the current he incurs danger of stopping the device completely if he loosens the contacts too much or of overtuning the reed if he screws them too tight; however, my improvements comprehend both arrangements.

As a result of my improvements the reed is forced to vibrate in synchronism with the current throughout a large range of relative frequencies; manufacture is facilitated by the fact that accurate tuning of the reeds is no longer necessary; and it becomes possible to make a rectifier which will exhibit higher efficiency, less sparking and more rapid charging of the batteries; although I do not limit myself to the use of these improvements for rectifiers nor in any other way except as specifically recited in the claims hereto annexed.

Having thus described my invention, what I claim is:

1. In a combined rectifier and transformer, a vibratory armature supported in series with the primary magnetic flux of said transformer and tuned out of resonance with the frequency thereof, in combination with means additional to the magnetic circuit of the transformer itself for impressing two additional magnetic fluxes thereon, one of which is uni-directional and the other of which is alternating having a frequency equal to that of the primary flux and a phase displaced therefrom.

2. In a rectifier, in combination, a core, a solenoid surrounding the same and energized by the initial alternating current, a reed connected in magnetic circuit with said core and tuned slightly out of resonance with the current frequency, a source of uni-directional flux in operative relation to said reed, and means additional to the magnetic circuit of the transformer itself for impressing upon said reed a second alternating magnetic flux induced by the flux in said core, and so related to said core flux in magnitude and phase as to correct the mistuning of said reed.

3. In an alternating current rectifier, a synchronous vibrator comprising a tuned reed having a natural period unequal to the frequency of the line current from which the energy is drawn and means for creating in operative relation to said reed a uni-directional flux and two alternating fluxes, one of said alternating fluxes being produced directly by the line current and the other being produced by a secondary current induced by the first flux and having a magnitude independent of the load on the rectifier.

4. In an alternating current rectifier in combination, an alternating current magnet, a magnetically permeable tuned reed mounted in magnetic circuit therewith, said reed being out of resonance with the current frequency, contact members operable by said reed, means for actuating said reed including a source of uni-directional magnetic flux, and means for holding the reed in synchronism with the flux in said alternating current magnet comprising a solenoid operatively associated with said reed and means for delivering thereto a current of determined phase and magnitude induced by the flux in said alternating current magnet.

5. In an alternating current rectifier, in combination, a reed having a natural frequency slightly different from that of the current, and means for actuating said reed comprising a uni-directional magnetic circuit and two alternating magnetic circuits, all of which include said reed, one of said alternating magnetic circuits being energized by the current which is being rectified and the other being energized by an alternating current induced by the first mentioned current, the compound magnetic wave so produced being so related to the phase of the current being rectified as to compel the reed to vibrate in synchronism with the latter.

6. In a combined alternating current rectifier and transformer, in combination with the transformer primary, two secondary windings, a reed mounted in the magnetic circuit of the transformer primary and having contact members in circuit with one transformer secondary, means for imposing upon the reed a uni-directional magnetic flux, and an independent solenoid connected to the other secondary winding for superposing upon the reed a third magnetic flux so related to the natural frequency of the reed as to compel the same to vibrate in synchronism with the secondary current.

7. In a combined alternating current rectifier and transformer, the combination with a primary winding and two secondary windings, a reed mounted in the magnetic circuit of the transformer core and having contact members in circuit with one of said secondary windings, the natural frequency of said reed being somewhat different from that of the current, a direct current solenoid surrounding a part of the magnetic circuit which includes said reed, the direct current circuit including said contact members, and a third solenoid in circuit with the other secondary winding and also surrounding a portion of the magnetic circuit which includes said reed, whereby said reed is subjected to the combined influence of two alternating magnetic fluxes and one uni-directional flux, the second alternating flux being substantially independent of the load on the transformer.

8. In a combined alternating current rectifier and transformer, in combination, a reed mounted in the magnetic circuit of the transformer primary and having contact members in circuit with the transformer secondary, the natural frequency of said reed being somewhat greater than that of the current, and means for subjecting said reed to the combined influence of two alternating magnetic fluxes and one uni-directional magnetic flux, one of said alternating fluxes being that produced in the transformer core by the combined influence of the primary and secondary currents, and the other of said alternating fluxes being produced in an independent solenoid surrounding a portion of the magnetic circuit and fed by an auxiliary secondary winding of the said transformer.

9. In a rectifier for charging storage batteries, a transformer having a core and pole pieces, a vibratory armature having one end magnetically connected to one of said pole pieces and its other end extending toward the other pole piece, a pair of pole pieces of constant polarity arranged one on each side of said armature, contact members operatively connected to said armature, and an additional magnetizing circuit for said armature comprising a solenoid surrounding a portion of the magnetic circuit, and an auxiliary secondary winding for said solenoid.

10. A rectifier comprising a transformer having a primary, a main secondary, and an auxiliary secondary winding, direct current electromagnets, and a vibratory reed, said reed having contact members operatively connected to said main secondary winding and being located in position to be subject to the combined effect of the unidirectional flux from said direct current electromagnets and an alternating flux from the transformer-core, in combination with a solenoid surrounding a portion of the magnetic circuit and connected to said auxiliary secondary.

11. In a rectifier for charging storage batteries, a transformer having a core and pole pieces and two secondary windings, one of said pole pieces having a pair of branches, a vibratory armature of magnetically permeable material carried by the other pole piece and extending between said branches, a pair of contact members operatively connected to said armature, and a pair of direct current coils surrounding said branches, said coils being connected between the battery terminals, and said terminals being connected through said contact members to one of the secondary windings in such wise that the movement of said armature under the combined influence of the alternating and direct fluxes will connect said transformer windings to said battery terminals in accordance with the potential difference already existing therein, in combination with an additional magnetizing coil located in operative relation to said armature and connected in series with the other secondary winding.

12. In a rectifier for charging storage batteries, a transformer having a core and pole pieces and two secondary windings, a vibratory armature of magnetically permeable material carried by the one of said pole pieces and extending toward the other pole piece, a pair of contact members operatively connected to said armature, a pair of pole pieces of constant polarity located one at each side of said armature, connections between said contact members and one secondary winding and an independent magnetizing coil for said armature connected to the other secondary winding, whereby said armature is subjected to an additional magnetic flux out of phase with the primary flux.

13. In a rectifier for charging storage batteries, a transformer having a core and pole pieces and two secondary windings, a vibratory armature magnetically connected at one end to one of said pole pieces and the other pole piece having a pair of branches between which the other end of said armature projects, a direct current coil connected between the battery terminals and associated with said last pole piece and its branches in such wise as to shield one or the other of said branches from the magnetic flux induced by the alternating current applied to the primary winding, an additional magnetizing winding surrounding the magnetic circuit of said armature and connected to one secondary winding, and contact members operatively associated with said armature and adapted to connect the other secondary winding intermittently in circuit with a battery.

14. An alternating current rectifier, comprising, in combination, a core having a primary and two secondary windings and two pole pieces, a pair of branches carried by one of said pole pieces and having electro-magnetic coils thereon, a vibratory armature secured to the other of said pole pieces and extending between said branches, said armature having a natural frequency slightly different from that of the current with which the device is to be used, a pair of contact members operatively associated with said armature, means for attaching a storage battery to one of said secondary windings so as to commutate between said branches the magnetic flux produced by the alternating current windings, an auxiliary magnetizing coil operatively associated with the magnetic circuit which contains said armature and connected to the other secondary winding, and connections between the other secondary winding and said contact members whereby a uni-directional current is supplied to said coils in the same direction as that derived from such batteries.

15. An alternating current rectifier comprising, in combination, an alternating magnetic circuit containing a vibratory member whose natural frequency differs somewhat from that of the current, a part of said circuit adjacent to the free end of said member being branched to define opposed poles between which said member is freely movable, two independent alternating current windings surrounding different parts of said magnetic circuit for producing an alternating field therein, a source of uni-directional magnetic flux operatively associated with said branches, contact devices operatively connected to said vibratory member, and connections between said alternating windings and a source of alternating current, one of said alternating current windings being in series with the transformer load and the other being independent of the transformer load.

16. An alternating current rectifier comprising an alternating magnetic circuit, part of which is branched and part unitary, such unitary part comprising a vibratory member of permeable material, one of whose ends is fixed and the other of whose ends projects between the branches, said branches themselves constituting a second magnetic circuit, magnetizing windings surrounding the unitary part of said first magnetic circuit, direct current windings surrounding a part of said second magnetic circuit, contact devices operatively connected to said vibratory member and connecting said windings together in commutating relation, and an additional magnetizing winding operatively associated with said vibratory member and connected to said first windings in split-phase relation.

17. In a rectifier, an alternating current coil having a core and pole pieces, one of which has a pair of magnetic branches, a vibratory armature having one end projecting freely between said branches and the other end magnetically connected to the other pole piece, means for creating a uni-directional magnetic flux through said branches, contact members operatively associated with said armature, connections between said contact members and separated parts of said coil adapted to make and break the circuit at predetermined intervals, and an additional magnetizing winding operatively associated with said armature, and arranged to be energized by the same source of alternating current as said first coil but in dissimilar phase.

In testimony whereof, I hereunto affix my signature.

JOSEPH R. BARNHART.